US008514337B2

(12) United States Patent
Sakurada et al.

(10) Patent No.: US 8,514,337 B2
(45) Date of Patent: Aug. 20, 2013

(54) ELECTRONIC APPARATUS

(75) Inventors: Hiroki Sakurada, Kumagaya (JP); Takayuki Soga, Fukaya (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 0 days.

(21) Appl. No.: 13/431,742

(22) Filed: Mar. 27, 2012

(65) Prior Publication Data

US 2013/0082992 A1    Apr. 4, 2013

(30) Foreign Application Priority Data

Oct. 3, 2011 (JP) .................................. 2011-219421

(51) Int. Cl.
*H04N 5/64* (2006.01)
*H04N 7/14* (2006.01)
*G06F 3/038* (2006.01)

(52) U.S. Cl.
USPC ............. 348/843; 348/836; 348/14; 345/207

(58) Field of Classification Search
USPC ............................ 348/836, 843, 14; 345/207
See application file for complete search history.

(56) References Cited

U.S. PATENT DOCUMENTS

| 2003/0161623 | A1* | 8/2003 | Saruhashi | 396/428 |
| 2009/0008540 | A1* | 1/2009 | Tanida | 250/239 |
| 2009/0268401 | A1* | 10/2009 | Krah | 361/679.55 |
| 2010/0171806 | A1* | 7/2010 | Matsuda | 348/14.08 |

FOREIGN PATENT DOCUMENTS

| JP | 2000-349465 | 12/2000 |
| JP | 2001-346178 | 12/2001 |
| JP | 2003-198990 | 7/2003 |
| JP | 2004-267427 | 9/2004 |
| JP | 2007-163816 | 6/2007 |
| JP | 2007-292845 | 11/2007 |
| JP | 2010-224129 | 10/2010 |

OTHER PUBLICATIONS

Japanese Patent Application No. 2011-219421; First Office Action; Mailed Jun. 19, 2012 (with English translation).

* cited by examiner

*Primary Examiner* — Sath V Perungavoor
*Assistant Examiner* — Xiaolan Xu
(74) *Attorney, Agent, or Firm* — Blakely, Sokoloff, Taylor & Zafman LLP

(57) ABSTRACT

According to one embodiment, an electronic apparatus is provided with a housing, display module, holder, and camera module. The housing has a front surface formed with an opening. The display module is accommodated in the housing and includes a screen exposed in the opening. The holder is secured to the display module. The camera module is held by the holder so that it can capture an image outside the housing.

12 Claims, 8 Drawing Sheets

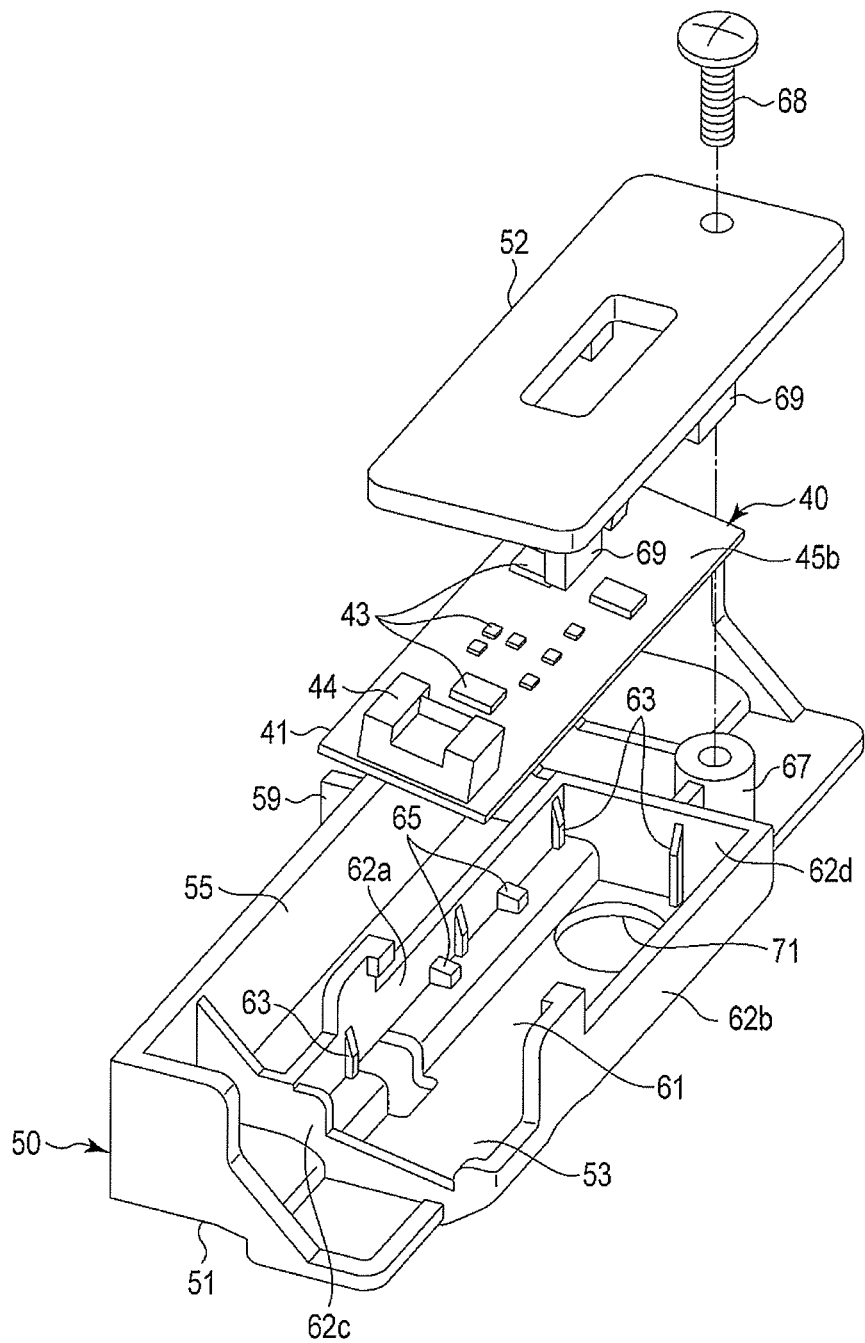
F I G. 5

ELECTRONIC APPARATUS

CROSS-REFERENCE TO RELATED APPLICATIONS

This application is based upon and claims the benefit of priority from prior Japanese Patent Application No. 2011-219421, filed Oct. 3, 2011, the entire contents of which are incorporated herein by reference.

FIELD

Embodiments described herein relate generally to an electronic apparatus on which is mounted a camera module.

BACKGROUND

An attempt has been made to furnish an electronic apparatus, such as a liquid-crystal television, with a camera configured to recognize, for example, viewers. The camera is accommodated together with a liquid-crystal panel in a housing and serves to capture data from outside the housing through the front of the housing. The positional relationship between the camera and panel is essential to the control of video image data to be displayed on the liquid-crystal panel, based on the data captured by the camera, for example.

BRIEF DESCRIPTION OF THE DRAWINGS

A general architecture that implements the various features of the embodiments will now be described with reference to the drawings. The drawings and the associated descriptions are provided to illustrate the embodiments and not to limit the scope of the invention.

FIG. 5 is an exemplary exploded perspective view showing the camera holder and camera module;

DETAILED DESCRIPTION

Various embodiments will be described hereinafter with reference to the accompanying drawings. In general, according to one embodiment, an electronic apparatus comprises a housing, display module, holder, and camera module. The housing comprises a front surface formed with an opening. The display module is accommodated in the housing and comprises a screen exposed in the opening. The holder is secured to the display module. The camera module is held by the holder so that it can capture an image outside the housing.

The embodiments will now be described with reference to FIGS. 1 to 8.

Figure 1:
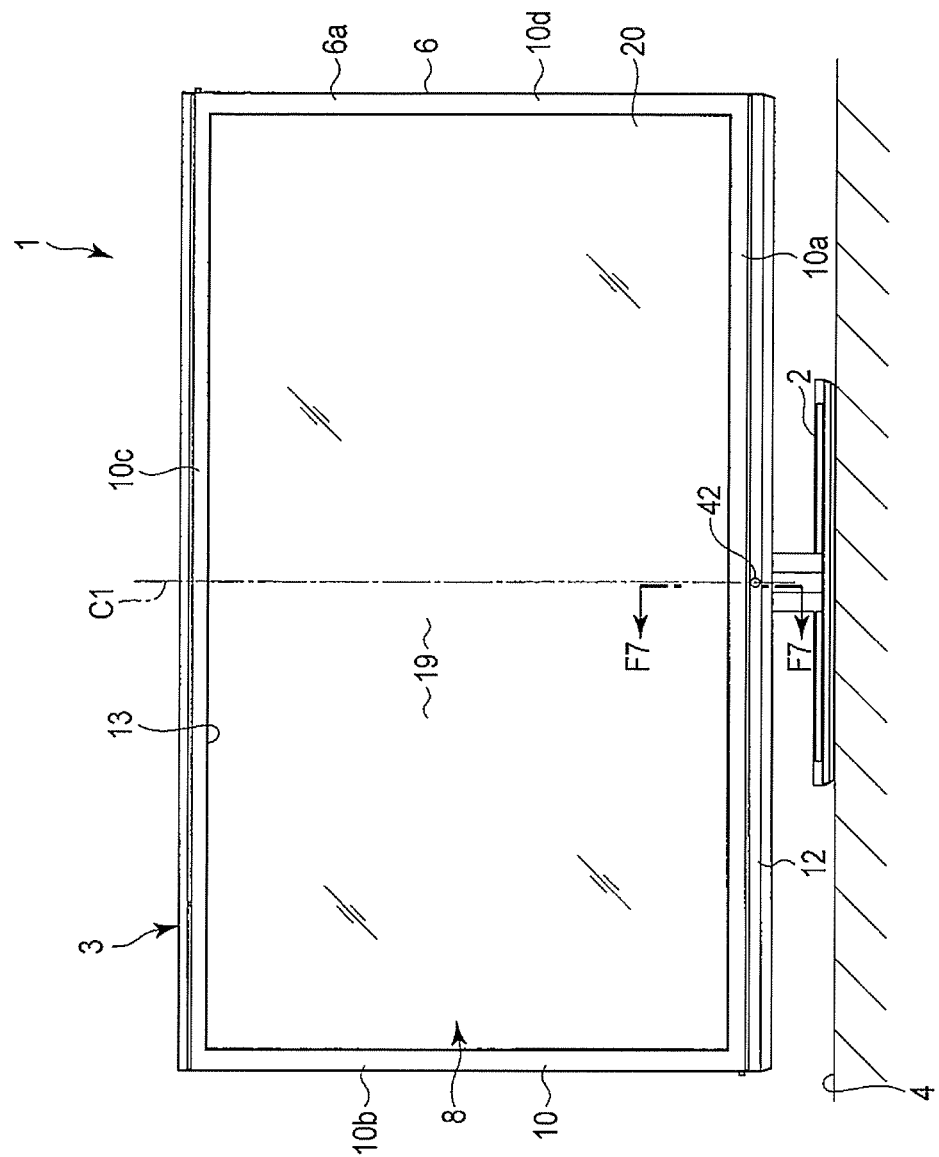
FIG. 1 is an exemplary plan view of a liquid-crystal television according to an embodiment.

FIG. 1 shows a liquid-crystal television 1 as an example of an electronic apparatus. The television 1 comprises a pedestal 2 and television main body 3. The pedestal 2 is mounted on a supporting surface 4 of, for example, a television stand. The main body 3 is supported by the pedestal 2 so that it stands upright on the supporting surface 4.

Figure 7:
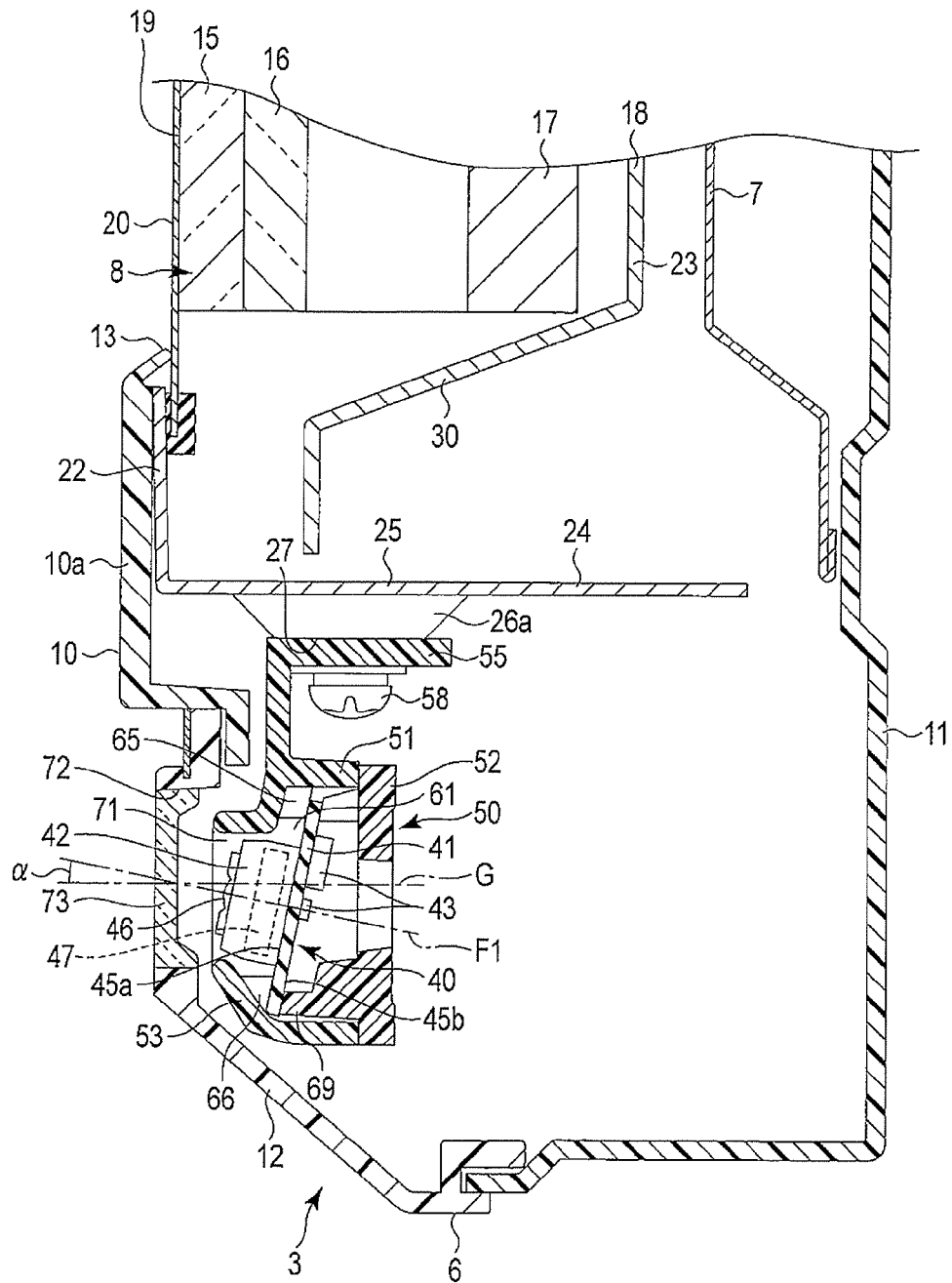
FIG. 7 is an exemplary sectional view taken along line F7-F7 of FIG. 1.
Figure 8:
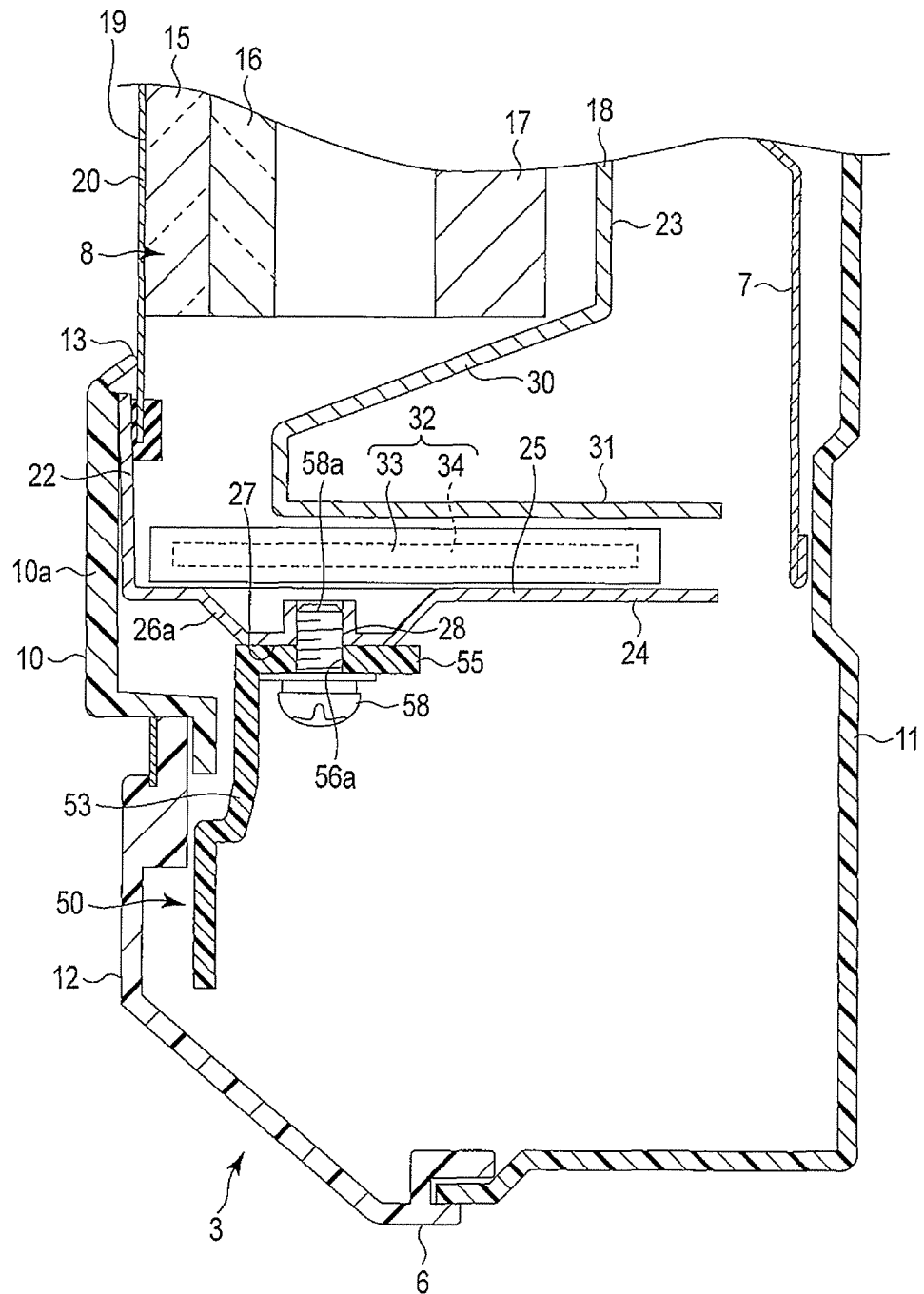
FIG. 8 is an exemplary sectional view showing the positional relationship between the outer frame of the display module and the camera holder.

As shown in FIGS. 1, 7 and 8, the main body 3 comprises a cabinet 6, frame 7, and liquid-crystal display module 8. The cabinet 6 is an example of a housing. The cabinet 6 comprises a front cover 10, back cover 11, and decorative panel 12.

The front cover 10, which consists mainly of a synthetic resin, comprises first to fourth edge portions 10a to 10d. The first and third edge portions 10a and 10c extend horizontally along the width of the cabinet 6 and are located parallel to and spaced apart from each other along the height of the cabinet. The second and fourth edge portions 10b and 10d extend vertically along the height of the cabinet 6 and are located parallel to and spaced apart from each other along the width of the cabinet. Thus, the first to fourth edge portions 10a to 10d cooperate with one another to define a rectangular opening 13.

The back cover 11, which is a rectangular plastic plate, is combined with the front cover 10 so that it covers the front cover from behind.

The decorative panel 12 extends horizontally along the entire width of the cabinet 6 below the opening 13. The panel 12 spans between the first edge portion 10a, which defines the lower edge of the opening 13, and the lower edge portion of the back cover 11. The decorative panel 12, along with the front cover 10, constitutes a front surface 6a of the cabinet 6.

The frame 7, an element supporting the liquid-crystal display module 8, is formed of, for example, a metal plate. The frame 7 is secured to the inner surface of the back cover 11 by screws.

The liquid-crystal display module 8 of the present embodiment is a naked-eye display module configured to reproduce a three-dimensional video image without the use of, for example, dedicated glasses. The display module 8 is accommodated in the cabinet 6.

Figure 2:
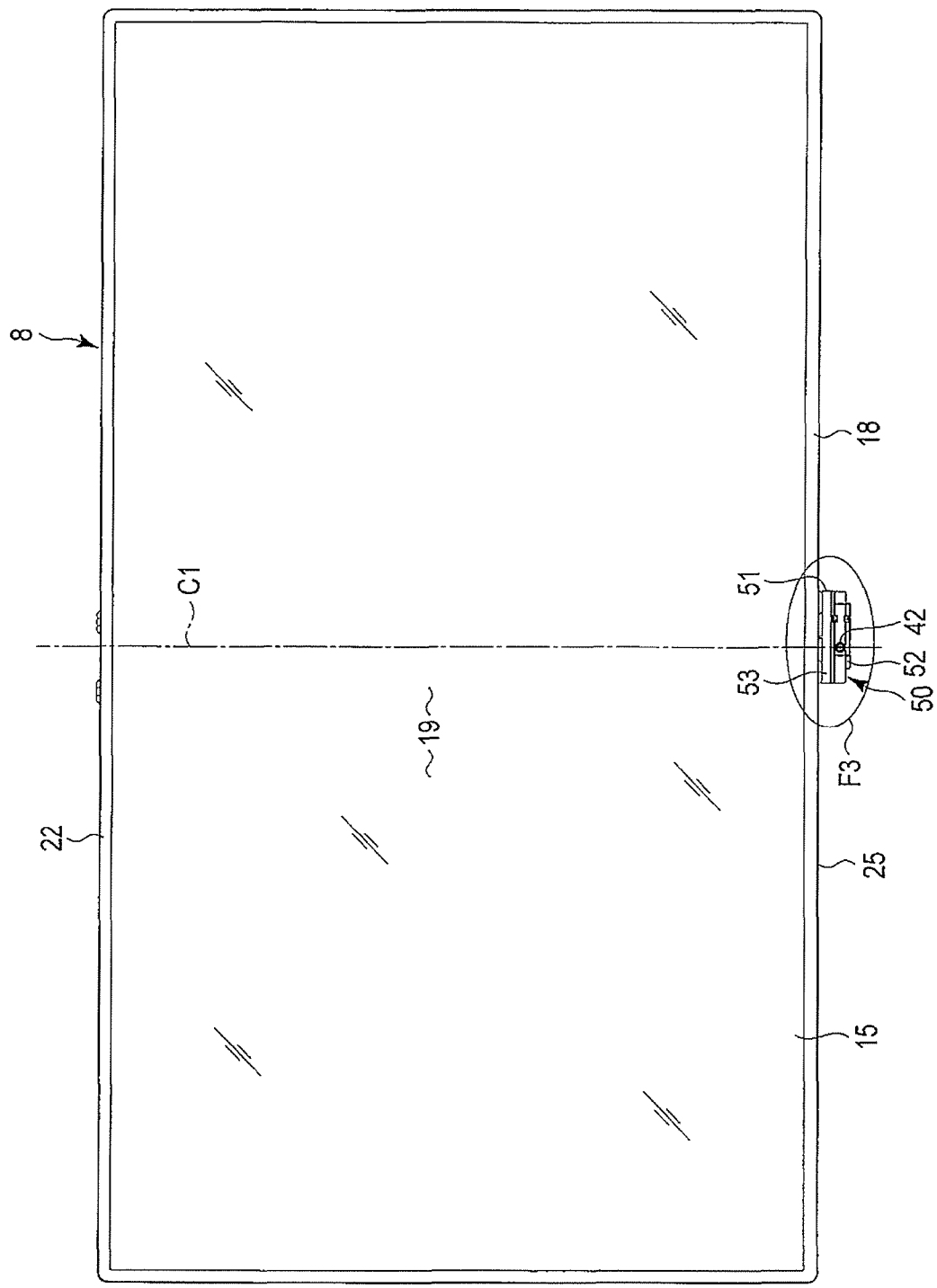
FIG. 2 is an exemplary front view of a liquid-crystal display module according to the embodiment.

As shown in FIGS. 2, 7 and 8, the liquid-crystal display module 8 comprises a liquid-crystal panel 15, light-diffusing plate 16, backlight 17, and outer frame 18. The liquid-crystal panel 15 is an example of a display panel and comprises a screen 19 that projects a video image. The screen 19 is covered by a lenticular sheet 20. The light-diffusing plate 16 is a translucent plate disposed on the back of the liquid-crystal panel 15. The backlight 17 is located behind the panel 15 so that it faces the light-diffusing plate 16.

The outer frame 18 surrounds and holds the liquid-crystal panel 15, light-diffusing plate 16, and backlight 17. The outer frame 18 is located at the outer peripheral portion of the liquid-crystal display module 8 off the screen 19 of the liquid-crystal panel 15. Further, the outer frame 18 consists mainly of, for example, a metallic material and is more rigid than the plastic cabinet 6.

The outer frame 18 comprises a bezel 22 and back panel 23. The bezel 22 is located around the screen 19 of the liquid-crystal panel 15. The outer peripheral portion of the lenticular sheet 20 that covers the screen 19 is bonded to the inner surface of the bezel 22. The sheet 20 is exposed to the outside of the cabinet 6 through the opening 13.

As shown in FIG. 7, a first flange portion 24 is integrally formed on the outer peripheral edge of the bezel 22. The first flange portion 24 is bent rearward at right angles from the outer peripheral edge portion of the bezel 22 so that it is circumferentially continuous relative to the bezel 22.

The first flange portion 24 comprises a horizontal portion 25, which extends transversely relative to the liquid-crystal panel 15, passing below the panel 15. The horizontal portion 25 is formed with a pair of boss portions 26a and 26b. The boss portions 26a and 26b project integrally downward from the horizontal portion 25. The projected end of each boss portion has a flat supporting surface 27. Further, a threaded hole 28 and positioning fitting hole 29 are formed in the central part of the supporting surface 27.

Figure 3:
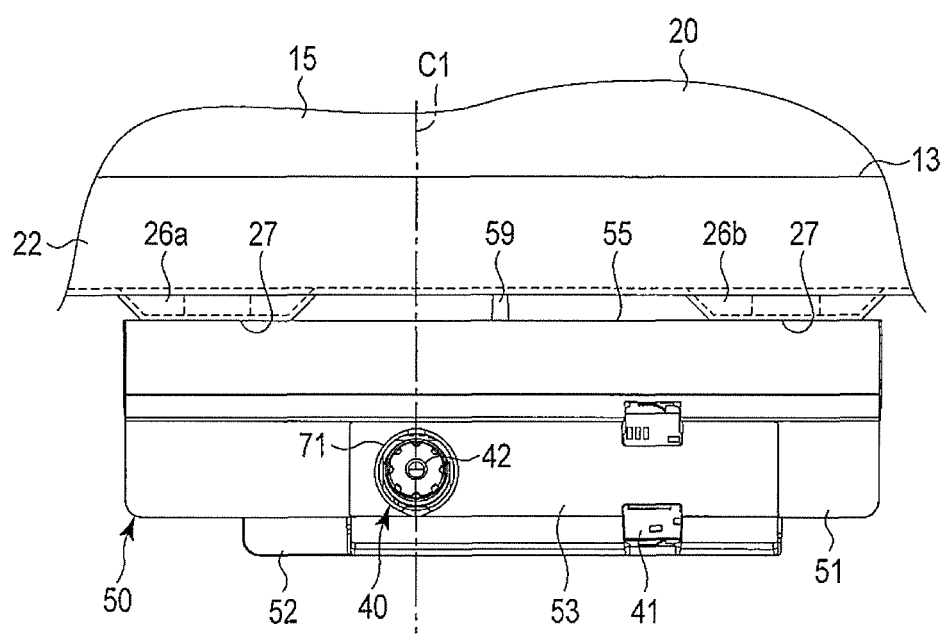
FIG. 3 is an exemplary enlarged front view showing a region F3 of FIG. 2.
Figure 4:
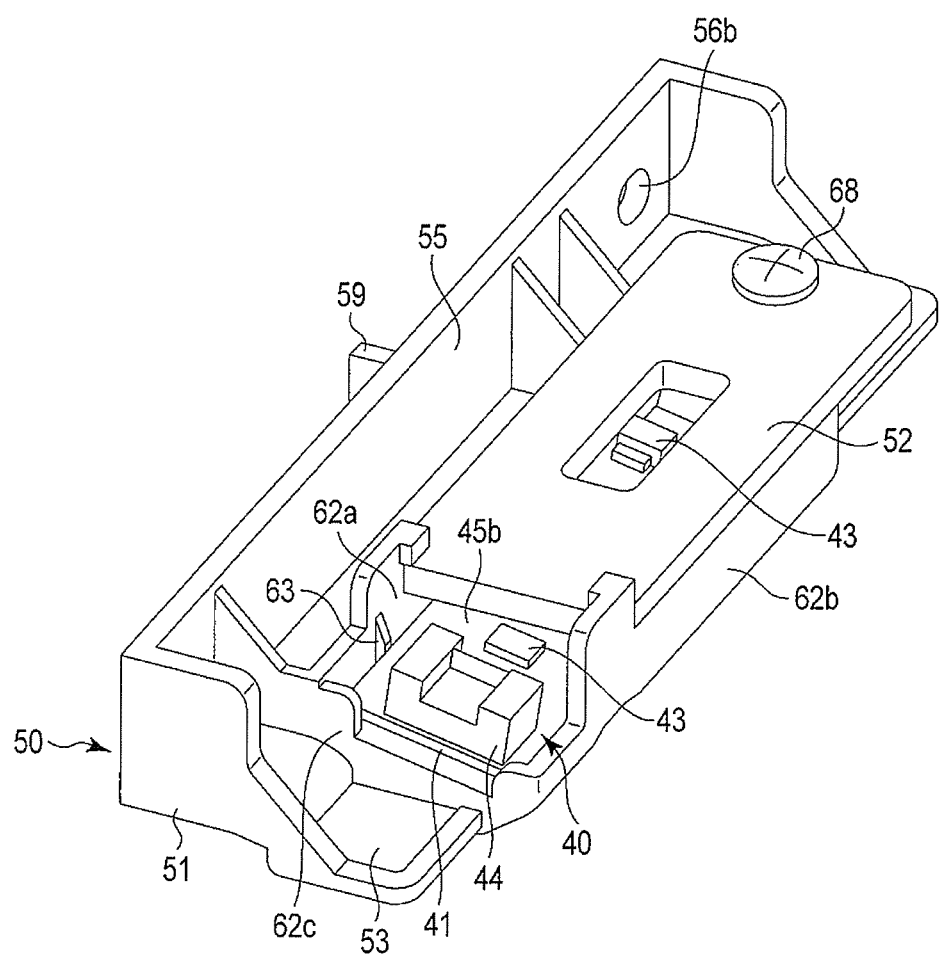
FIG. 4 is an exemplary perspective view showing a camera module incorporated in a camera holder.

As shown in FIGS. 2 and 3, the boss portions 26a and 26b are separated transversely relative to the screen 19 of the liquid-crystal panel 15. In the present embodiment, a centerline C1, which extends along the height of the screen 19 through its transverse center, is located between the boss portions 26a and 26b.

As shown in FIGS. 7 and 8, the back panel 23 is secured to the front surface of the frame 7 so that it covers the backlight 17 from behind. A second flange portion 30 is integrally formed on the outer peripheral edge portion of the back panel 23. The second flange portion 30 is bent forward from the outer peripheral edge portion of back panel 23 so that it is circumferentially continuous relative to the panel 23.

A turn-back portion 31 is integrally formed on that part of the second flange portion 30 which extends transversely relative to the liquid-crystal panel 15, passing below the panel 15. The turn-back portion 31 is bent at right angles from the distal end of the second flange portion 30 toward the area behind the back panel 23.

Further, the turn-back portion 31 is located above and opposed to the horizontal portion 25 that comprises the boss portions 26a and 26b. In the present embodiment, a circuit component 32 is accommodated in a gap between the horizontal portion 25 and turn-back portion 31. The circuit component 32 is an example of a built-in component. The circuit component 32 comprises a plastic case 33 and a circuit board 34 accommodated in the case 33. The circuit component 32 closes respective open ends of the boss portions 26a and 26b on the horizontal portion 25.

On the other hand, the liquid-crystal television 1 according to the present embodiment is mounted with a camera module 40. The camera module 40 is an element that serves to recognize the position of a viewer relative to the screen 19 that projects a video image.

As shown in FIG. 7, the camera module 40 is accommodated together with the liquid-crystal display module 8 in the cabinet 6. According to the present embodiment, the camera module 40 is disposed below the display module 8. The camera module 40 comprises a module substrate 41, camera 42, chip components 43, and connector 44.

The module substrate 41 is formed of an elongated printed circuit board extending transversely relative to the liquid-crystal panel 15. The substrate 41 has first and second surfaces 45a and 45b. The second surface 45b is located at the back of the first surface 45a.

The camera 42 is soldered to the first surface 45a of the module substrate 41 so that it is located at one longitudinal end portion of the substrate 41. The camera 42 comprises a front lens 46, which defines a field of view during image capture operation, and image capture element 47 configured to receive light transmitted through the front lens 46. Further, the camera 42 has an optical axis F1. The optical axis F1 extends straight through the center of the field of view.

The chip components 43 are elements for controlling the operation of the camera 42. The chip components 43 are mounted on either of the first and second surfaces 45a and 45b of the module substrate 41.

The connector 44 is soldered to the second surface 45b of the module substrate 41. The connector 44 is electrically connected to control means for driving the liquid-crystal panel 15 by means of a camera harness.

As shown in FIGS. 4 to 8, the camera module 40 is secured to the outer frame 18 of the liquid-crystal display module 8 by means of a plastic camera holder 50. The camera holder 50 comprises a holder body 51 and pressure plate 52.

The holder body 51 comprises a front panel 53. The front panel 53 is in the form of a rectangle one size larger than the module substrate 41 and extends transversely relative to the liquid-crystal panel 15.

Figure 6:
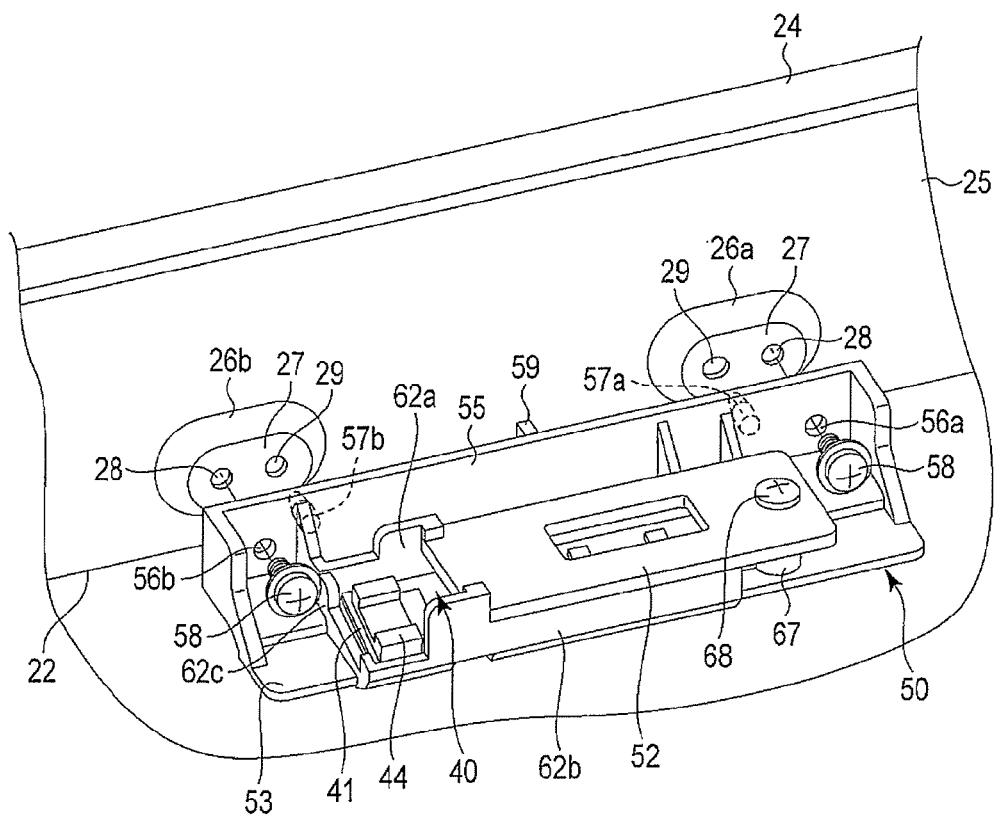
FIG. 6 is an exemplary perspective view showing the positional relationship between an outer frame of the display module and the camera holder holding the camera module.

As shown in FIGS. 6 and 7, a flange portion 55 is formed on one side edge of the front panel 53. The flange portion 55 is bent substantially at right angles from the one side edge of the front panel 53. The flange portion 55 is formed with a pair of screw insertion holes 56a and 56b and a pair of columnar protrusions 57a and 57b. The screw insertion holes 56a and 56b are separated longitudinally relative to the flange portion 55 from each other so that they correspond individually to the respective threaded holes 28 of the boss portions 26a and 26b of the outer frame 18. Likewise, the protrusions 57a and 57b are separated longitudinally relative to the flange portion 55 from each other so that they correspond individually to the respective fitting holes 29 of the boss portions 26a and 26b.

The flange portion 55 of the camera holder 50 is caused to abut the respective supporting surfaces 27 of the boss portions 26a and 26b. Thus, the protrusions 57a and 57b are fitted in the fitting holes 29, individually, so that the screw insertion holes 56a and 56b are coaxial with their corresponding threaded holes 28.

As shown in FIGS. 6 to 8, a pair of screws 58 are inserted individually into the screw insertion holes 56a and 56b from below the flange portion 55. The screws 58 are driven into the threaded holes 28 through the screw insertion holes 56a and 56b, individually. Consequently, the holder body 51 is secured to the horizontal portion 25 of the bezel 22, and its front panel 53 rises so that it faces the inner surface of the decorative panel 12 inside the cabinet 6.

When the holder body 51 is secured to the horizontal portion 25 of the bezel 22, as best shown in FIG. 8, respective distal ends 58a of the screws 58 are accommodated within the boss portions 26a and 26b, individually. In other words, the distal ends 58a of the screws 58 are prevented from projecting between the horizontal portion 25 of the bezel 22 and the turn-back portion 31 of the back panel 23. Thus, a sufficient space to accommodate the circuit component 32 can be secured between the horizontal portion 25 and turn-back portion 31.

As shown in FIGS. 3 to 6, a rib-like wall portion 59 is integrally formed on the flange portion 55 of the camera holder 50. The wall portion 59, which is an example of an engaging portion, projects from the flange portion 55 toward the horizontal portion 25 of the bezel 22. The wall portion 59 extends at right angles to the flange portion 55 between the screw insertion holes 56a and 56b.

When the holder body 51 is secured to the horizontal portion 25 of the bezel 22, the wall portion 59 extends along the depth of the liquid-crystal display module 8 and abuts the horizontal portion 25 between the boss portions 26a and 26b. Specifically, the wall portion 59 has the same height as the boss portions 26a and 26b. Thus, the holder body 51 can be prevented from being oscillatingly displaced along the height of the display module 8 and can be firmly secured in position on the outer frame 18.

As shown in FIGS. 7 and 8, moreover, the holder body 51 is spaced apart from the decorative panel 12 and the first edge portion 10a of the front cover 10 of the cabinet 6. Consequently, gaps are formed individually between the holder body 51 and the first edge portion 10a of the front cover 10 and between the holder body 51 and decorative panel 12, so that the holder body 51 is held off the cabinet 6.

As shown in FIGS. 5 and 7, the front panel 53 comprises a mounting area 61 in which the module substrate 41 is fitted. The mounting area 61 is defined by first to fourth wall portions 62a to 62d that surround the outer peripheral edge of the module substrate 41. The first to fourth wall portions 62a to 62d project from the front panel 53 toward the back of the front panel 53.

A plurality of guide projections 63 are integrally formed on the respective inner surfaces of the first to fourth wall portions 62a to 62d. The guide projections 63 project from the wall portions 62a to 62d into the mounting area 61. The guide projections 63 are spaced circumferentially relative to the module substrate 41 and in slidable contact with the outer peripheral edge of the substrate 41.

The first wall portion 62a extends horizontally along the upper edge of the raised module substrate 41. Likewise, the second wall portion 62b extends horizontally along the lower edge of the raised substrate 41.

A plurality of first projections 65 are formed at a corner portion defined by the first wall portion 62a and front panel 53. The first projections 65 are spaced longitudinally relative to the first wall portion 62a. A plurality of second projections 66 are formed at a corner portion defined by the second wall portion 62b and front panel 53. The second projections 66 are spaced longitudinally relative to the second wall portion 62b. As shown in FIG. 7, the respective distal ends of the first and second projections 65 and 66 individually abut the outer peripheral portion of the first surface 45a of the module substrate 41.

The distal ends of the first projections 65 are located behind those of the second projections 66 with respect to the front panel 53. Further, the respective distal ends of the first and second projections 65 and 66 are inclined forward relative to a vertical line with distance from the top of the holder body 51.

The pressure plate 52 abuts the respective distal ends of the first to fourth wall portions 62a to 62d and covers the mounting area 61 from behind the front panel 53. The pressure plate 52 is secured to a screw receiving portion 67, which projects from the front panel 53, by a screw 68.

In addition, the pressure plate 52 comprises a plurality of third projections 69, which project into the mounting area 61. The respective distal ends of the third projections 69 abut the outer peripheral portion of the second surface 45b of the module substrate 41. Thus, the pressure plate 52 holds the module substrate 41 between itself and the holder body 51. In this way, the camera module 40 is held in position in the camera holder 50.

The camera 42 of the camera module 40 is exposed forward from the camera holder 50 through a through-hole 71 in the front panel 53 of the holder body 51. Further, the through-hole 71 of the front panel 53 is exposed forward from the cabinet 6 through a camera window 72 in the decorative panel 12. The camera window 72 is closed by an optically transparent lens cover 73.

In the present embodiment, the distal ends of the first and second projections 65 and 66 in contact with module substrate 41 are inclined. As shown in FIG. 7, therefore, the camera module 40 is inclined relative to the screen 19 so that the optical axis F1 of the camera 42 is elevated higher with forward distance from the liquid-crystal panel 15. The angle of inclination α of the optical axis F1 relative to a horizontal line G is, for example, 11°. Thus, the face of the viewer who faces the screen 19 of the liquid-crystal television 1 is located within the range of the field of view of the camera 42. The angle of inclination α of the optical axis F1 of the camera 42 is not limited to 11°, and the axis F1 should only be inclined at some angle to the horizontal line G.

FIGS. 2 and 3 show how the camera module 40 is held on the outer frame 18 of the liquid-crystal display module 8 by means of the camera holder 50. The camera 42 of the camera module 40 is located on the centerline C1 of the screen 19 of the liquid-crystal panel 15 just below the screen. Consequently, the optical axis F1 of the camera 42 crosses the centerline C1.

When the viewer is watching a three-dimensional video image on the screen 19 of the liquid-crystal panel 15, according to the liquid-crystal television 1 constructed in this manner, the camera 42 of the camera module 40 captures an image of the viewer's face, thereby capturing the position of the viewer's face relative to the screen 19 as information from outside the television 1.

Specifically, the camera 42 captures data on the viewer's movement when the viewer having been watching the screen 19, sitting on the floor, for example, changes the sitting position. The captured data is delivered to drive means for the liquid-crystal panel 15. Based on the data from the camera 42, the drive means recognizes the position of the viewer relative to the screen 19 and controls the image directed from the panel 15 to the viewer. If the viewer watching the screen 19 moves, therefore, the visible range of the three-dimensional video image on the screen 19 moves so that the image cannot be distorted.

In the present embodiment, the camera module 40 is secured to the outer frame 18 of the liquid-crystal display module 8. The outer frame 18 is more rigid and more resistant to bending and torsion than the cabinet 6 that constitutes the outer shell of the television main body 3.

In other words, the camera module 40 is secured directly to the liquid-crystal display module 8 without the aid of the cabinet 6, whereby causes of variation in the position and attitude of the camera module 40, which is liable to occur during mounting of the module 40, can be reduced. Thus, the camera module 40 can be accurately positioned.

Consequently, the attitude of the camera module 40 is stabilized, so that the camera 42 can be accurately fixed to the position where the optical axis F1 of the camera 42 crosses the centerline C1, which passes through the center of the screen 19 of the liquid-crystal panel 15. Thus, the position of the viewer watching the screen 19, relative to the screen, can be ascertained without fail. This is a useful arrangement for the control of the direction of light from the liquid-crystal panel 15 to the viewer, based on, for example, the data captured by the camera 42.

According to the present embodiment, moreover, the camera holder 50 secured to the outer frame 18 of the liquid-crystal display module 8 is separated from the cabinet 6. In other words, the camera holder 50 is kept apart from the cabinet 6.

Even if the cabinet 6 less rigid than the outer frame 18 is deformed, for example, as the liquid-crystal television 1 is mounted on the mounting surface 4, therefore, the cabinet 6 can be prevented from interfering with the camera holder 50. Thus, the position of the liquid-crystal display module 8 held on the camera holder 50 can be prevented from undesirably fluctuating, so that the positional relationship between the screen 19 and camera 42 can be accurately maintained.

In the present embodiment, furthermore, the module substrate 41 of the camera module 40 is held between the holder body 51 and pressure plate 52. According to this arrangement, screwing portions, including threaded holes and notches, can be eliminated from the module substrate 41, so that the substrate 41 can be made correspondingly smaller.

In addition, there is an advantage that the angle of inclination α of the optical axis F1 of the camera 42 can be adjusted by changing the inclination of the distal ends of the first and second projections 65 and 66 of the camera holder 50.

In the embodiment described herein, the camera module is located below the screen of the liquid-crystal panel. Alternatively, however, the camera module may be located above the screen. If the camera module is located above the screen, the optical axis of the camera should preferably be inclined downward with distance from the back of the panel.

Although the liquid-crystal television has been described as an example of the electronic apparatus in connection with the embodiment, moreover, the electronic apparatus is not limited to the liquid-crystal television. The embodiment is also widely applicable to various other electronic apparatuses, such as notebook or slate computers, cell phones, smartphones, personal digital assistants, portable game machines, etc.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. An electronic apparatus comprising:
   a housing comprising a front surface formed with an opening;
   a display module accommodated in the housing and comprising a screen exposed in the opening;
   a holder secured to the display module; and
   a camera module held by the holder and configured to capture an image outside the housing,
   wherein the camera module comprises a substrate and a camera mounted on the substrate, the camera being located on a centerline extending along the height of the screen through the transverse center of the screen, and the holder comprises a holder body secured to an outer peripheral portion of the display module and a pressure plate secured to the holder body, the holder body and the pressure plate being configured to hold the substrate of the camera module therebetween in cooperation with each other.

2. The electronic apparatus of claim 1, wherein the display module comprises a display panel comprising the screen and an outer frame more rigid than the housing and surrounding the display panel, and the holder is secured to the outer frame.

3. The electronic apparatus of claim 2, wherein the outer frame comprises a plurality of boss portions projecting to the outside of the outer frame, and the holder body of the holder is secured to the respective distal ends of the boss portions by screws, the distal ends of which are located within the boss portions, individually.

4. The electronic apparatus of claim 3, wherein the outer frame comprises a flange portion on which the boss portions are formed, and a built-in component is accommodated between the display panel and the flange portion of the outer frame.

5. The electronic apparatus of claim 1, wherein the camera comprises an optical axis extending forward relative to the screen through the center of the field of view of the camera, the optical axis being inclined along the height of the screen with respect to a horizontal line.

6. The electronic apparatus of claim 5, wherein the holder body of the holder comprises a plurality of projections configured to abut the substrate of the display module, thereby settling the attitude of the camera module so that the optical axis of the camera is inclined, and the pressure plate of the holder and the projections are configured to hold the substrate therebetween.

7. The electronic apparatus of claim 1, wherein the screen of the display module is covered by a lenticular sheet.

8. An electronic apparatus comprising:
   a housing;
   a display module accommodated in the housing;
   a holder secured to an outer peripheral portion of the display module and separated from the inner surface of the housing; and
   a camera module held by the holder and configured to capture information from outside the housing,
   wherein the camera module comprises a substrate and a camera mounted on the substrate, the camera being located on a centerline extending along the height of the display module through the transverse center of the display module, and the holder comprises a holder body secured to an outer peripheral portion of the display module and a pressure plate secured to the holder body, the holder body and the pressure plate being configured to hold the substrate of the camera module therebetween in cooperation with each other.

9. The electronic apparatus of claim 8, wherein the display module comprises a display panel comprising a screen exposed to the outside of the housing and an outer frame more rigid than the housing and surrounding the display panel, and the holder is secured to the outer frame.

10. An electronic apparatus comprising:
    a housing;
    a display module accommodated in the housing, the display module comprising a display panel, an outer frame more rigid than the housing and surrounding the display panel, and a plurality of boss portions projecting to the outside of the outer frame from the outer frame;
    a holder secured to the respective distal ends of the boss portions, the holder comprising an engaging portion in contact with the outer frame between the boss portions; and
    a camera module held by the holder and configured to capture information from outside the housing.

11. The electronic apparatus of claim 10, wherein the boss portions are separated transversely relative to the display module from each other, and the engaging portion extends along the depth of the display module.

12. The electronic apparatus of claim 10, wherein the camera module comprises a substrate and a camera mounted on the substrate, the camera being located on a centerline extending along the height of the screen through the transverse center of the screen.

* * * * *